3,068,235
QUATERNARY AMMONIUM SALTS OF ω-(N-METHYL-2,6-DIMETHYLANILINO) ALKYL HALIDES
Seymour L. Shapiro, Hastings-on-Hudson, and Louis Freedman, Bronxville, N.Y., assignors to U.S. Vitamin and Pharmaceutical Corporation, New York, N.Y., a corporation of Delaware
No Drawing. Filed Jan. 5, 1960, Ser. No. 487
5 Claims. (Cl. 260—293)

This invention is concerned with ω-(N-methyl-2,6-dimethylanilino)alkyl halides having the following formula:

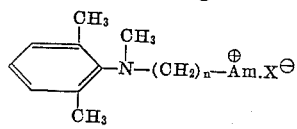

wherein Am is a lower tertiary alkylamino radical such as trimethylamino, triethylamino, N-methylpiperidino, N-methylpyrrolidino, and N-methylmorpholino, $n$ is an integer ranging from 3 to 6, and $X^-$ is a halide ion.

The compounds of this invention are particularly useful as pharmacological agents and especially as hypotensive agents.

The halides which serve as the initial reactants for the compounds of this invention are such that steric factors associated with the presence of the N-methyl group and methyl groups in the 2- and 6-positions of the benzene rings, depress self-quaternization at the anilino nitrogen. These halides upon treatment with a tertiary amine, afford the compounds of this invention, said compounds being characterized by mixed functional tertiary amine-quaternary amine structures.

A typical reaction is indicated by the equation below:

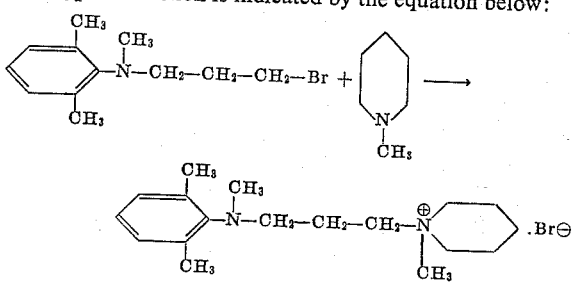

The quaternization is desirably carried out in an inert organic solvent such as acetonitrile, nitromethane, isopropyl alcohol and the like, and at reaction temperatures ranging from 20° C. to 100° C.

The requisite anilinoalkyl halides are prepared by reaction of the N-methyl-2,6-dimethylaniline with an excess of a dihalide of the type $X-(CH_2)_n-X$, wherein $n$ and $X$ have the same significance as described above. Desirably, potassium iodide is added to expedite the reaction. The preparation of such anilinoalkyl halides has been specifically detailed in our co-pending application, Serial No. 709,446, filed January 17, 1958, now U.S. Patent 2,921,094.

As more specifically illustrative of the preparation of the compounds contemplated by this invention, the following specific example will serve to illustrate the preparation of the compounds contemplated, with only the selection of starting materials required for the production of any desired specific compound.

EXAMPLE 1

N-Methyl-[3-(N-Methyl-2,6-Dimethylanilino)Propyl]-Piperidinium Bromide

A mixture of 1.79 g. (0.007 mole) of N-(3-bromopropyl)-N-methyl-2,6-dimethylaniline and 0.73 g. (0.0074 mole) of N-methylpiperidine in 5 ml. of acetonitrile was heated under reflux for one hour. On cooling, 0.95 g. (38%) of colorless crystals were filtered off, washed with ethyl acetate and dried in vacuo, M.P. 185–187.5° C.

Analysis.—Calcd. for $C_{18}H_{31}BrN_2$: C, 60.8; H, 8.7; N, 7.9; Br, 22.5. Found: C, 60.9; H, 8.8; N, 7.9; Br, 22.6.

Other N-methyl-2,6-dimethylanilinoalkyl halides, in turn, can be reacted with different lower alkyl tertiary amines which may be exemplified by trimethylamine, triethylamine, N-methylpiperdine, N-methylpyrrolidine, N-methylmorpholine and the like, as has been shown in the foregoing equation.

Examples of such preparations are typified by compounds prepared and described in Table I, following the procedure of Example 1. The group Am represents the lower alkyl tertiary amine used to form the quaternary salt.

TABLE I

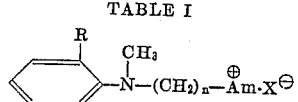

| $n$ | Am | X | M.P., °C. | Formula |
|---|---|---|---|---|
| 3 | triethylamine | Br | 142–144 | $C_{16}H_{33}BrN_2$ |
| 3 | N-methylpiperidine | Br | 185–187 | $C_{18}H_{31}BrN_2$ |
| 4 | triethylamine | Br | 150–152 | $C_{19}H_{35}BrN_2$ |
| 6 | N-methylpiperidine | Br | 133–134 | $C_{21}H_{37}BrN_2$ |

In a manner similar to that of the foregoing description cited in Example 1 and in Table I, other ω-(N-methyl-2,6-dimethylanilino)alkyl halides may be processed, such as ω-(N-methyl-2,6-dimethylanilino)-decamethylene bromide, etc. These in turn, can be converted to mixed tertiary amine-quaternary ammonium salts by reaction with tertiary amines.

This application is a continuation-in-part of our co-pending application, Serial No. 709,446, filed January 17, 1958, now U. S. Patent 2,921,094.

It is to be understood that it is intended to cover all changes and modifications of the examples of the invention herein chosen for the purpose of illustration which do not constitute a departure from the spirit and scope of the invention.

We claim:

1. The compound having the formula

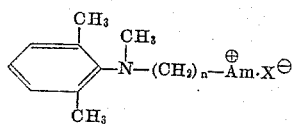

wherein $n$ is an integer selected from the group consisting of 3, 4 and 6; Am is a tertiary amino radical selected from the group consisting of trimethylamino, triethylamino, N-methylpiperidino, N-methylpyrrolidino, and N-methylmorpholino, and X is a member of the group consisting of chlorine and bromine.

2. The compound

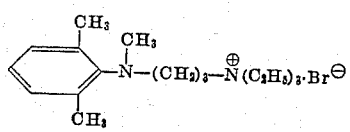

3. The compound
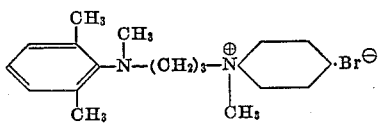
4. The compound
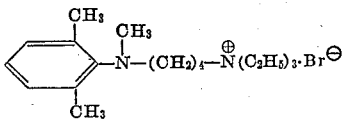
5. The compound
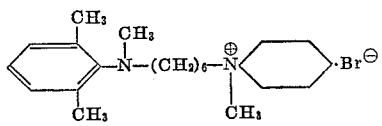
References Cited in the file of this patent
UNITED STATES PATENTS
| | | |
|---|---|---|
| 2,099,525 | Krzikalla et al. | Nov. 6, 1937 |
| 2,113,606 | Taub et al. | Apr. 12, 1938 |
| 2,623,880 | Hopff et al. | Dec. 30, 1952 |
FOREIGN PATENTS
| | | |
|---|---|---|
| 518,207 | Germany | Feb. 19, 1931 |
| 130,104 | Sweden | Nov. 21, 1950 |
OTHER REFERENCES
Halpern: Archives Internationales de Pharmacodynamie et de Therapie, vol. 68: p. 348 (1942).
Pratesi et al.: Bulletin de la Societe de Chemie Biologique, vol. 31: No. 4: p. 521 (1949).